June 15, 1948.    W. DZUS    2,443,309
FASTENING DEVICE
Filed Nov. 11, 1942
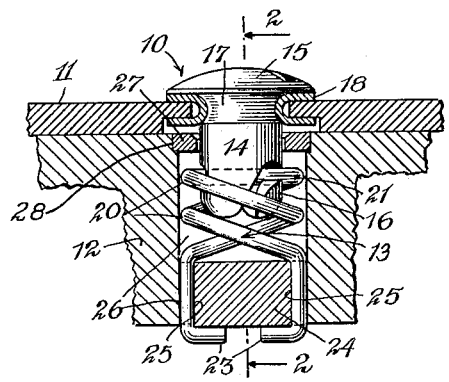
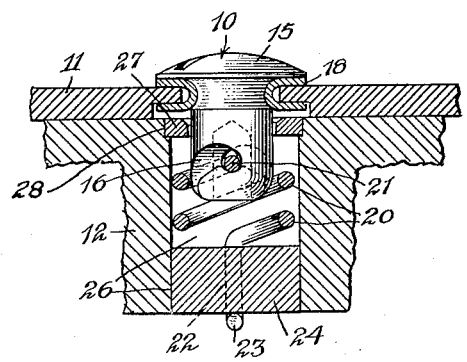
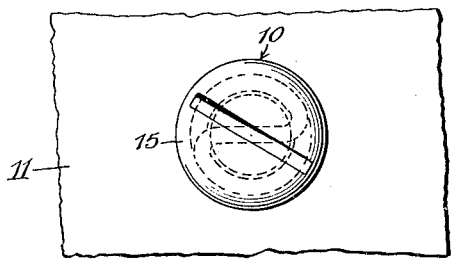
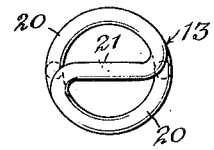
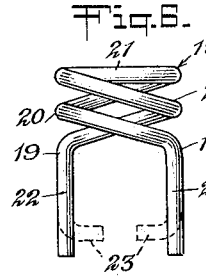
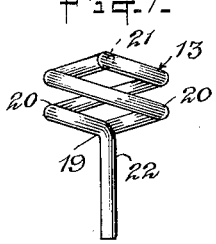
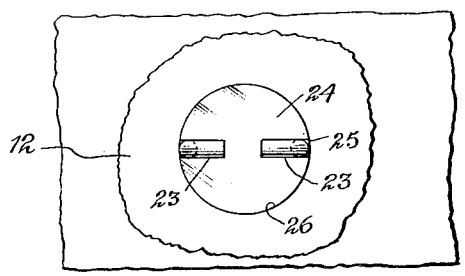
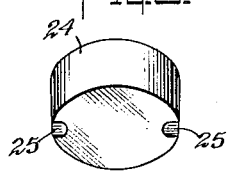
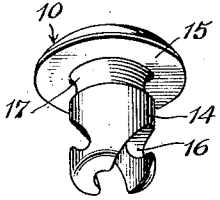
WITNESSES
INVENTOR
William Dzus
BY
ATTORNEYS Patented June 15, 1948

2,443,309

UNITED STATES PATENT OFFICE 2,443,309

FASTENING DEVICE

William Dzus, West Islip, N. Y.

Application November 11, 1942, Serial No. 465,237

9 Claims. (Cl. 24—221)

This invention relates to a fastening device for detachably connecting or fastening one part or component to another part or component of various and sundry devices, structural units and construction work.

More particularly, the device of the present invention relates to the type of device disclosed in my Patent No. 1,955,740, granted to me on April 24, 1934. Such type of device is designed and adapted for quickly, easily, and effectually attaching or fastening to each other components or parts of some device, structure or unitary construction and for likewise detaching or unfastening such parts.

The principal object of the present invention is the provision of a device of the indicated character which embodies improved features in order that the device is compact, well suited for its intended purpose and affords economic advantages with regard to the production, assembly and installation of the parts thereof for use.

The nature of the invention and its distinguishing features and advantages will appear when the following specification is read in conjunction with the accompanying drawing, in which—

Fig. 1 is a sectional view showing a fastening device of the invention in use;

Fig. 2 is a section taken on the line 2—2 of Fig. 1;

Fig. 3 is a top view;

Fig. 4 is a bottom view;

Fig. 5 is a top view of one of the fastener elements;

Fig. 6 is a side view of the element shown in Fig. 5;

Fig. 7 is a side view of the element shown in Fig. 5, but turned 90 degrees from the position thereof shown in Fig. 6;

Fig. 8 is a perspective view of the plug abutment per se;

Fig. 9 is a perspective view of the stud element of the device.

Referring now more particularly to the drawing, it will be apparent from Figs. 1 and 2 that the device involves the use of a button or stud fastener element 10 applied for turning movement to a part 11 to be fastened or attached to a second part 12 which carries a fastener element 13 of the present invention which cooperates with the fastener element 10.

The parts 11 and 12 may be components of divers structures and devices too numerous to mention, and which components are to be quickly attached to each other in a secure manner yet be readily detached when desired.

The element 10 is of standard type consisting of a shank 14 having a head 15 on one end and spirally slotted cam action means 16 embodied by the shank at the end opposite that having the head, and which means 16 is designed and adapted for cooperative engagement with the element 13 by the turning of the element 10.

The element 10 is turnably applied to the part 11 by means of a groove 17 in the shank below the head 15, and a grommet 18 secured to the part 11 is engaged in said groove 17 to thus complete the application of the element 10 to the part 11.

The element 13 consists of a piece of spring or resilient material, such as wire stock, which is bent and formed to provide two legs 19 having helixes or spring coils 20 joined by a cross-member 21 at one end of the element. The legs 19 each have a straight portion 22 and a laterally projecting terminal end portion 23 which serve as anchoring means. The legs 22 are longitudinally extending, that is, they extend in the same direction as the coils. The portions 22 are substantially parallel to each other and the portions 23 are disposed diametrically opposite each other at the end of the element 13 opposite that having the cross-member 21. The cross-member 21 is disposed centrally and diametrically with respect to the longitudinal axis of the element 13. The coils 20 of one leg 19 are intercoiled with those of the other leg 19, the coils of said legs being spiralled in the same direction.

In accordance with an important feature of the invention, the element 13 is retained in functioning position by a piece of material in the form of a plug 24 serving as an abutment. This plug 24 has grooves 25 in the opposite sides respectively, diametrically opposite each other to receive the portions 22 respectively, with the end portions 23 bearing on one flat face of the plug and two of the coils 20 bearing on the other flat face of the plug. In this manner the plug is associated with the element 13, and as a unit may be located in a hole or opening 26 extending through the part 12. The element 13 will be fixed in place by the mere act of driving the plug 24 into the opening 26. The plug has a driving fit to the wall of the opening and securely holds the element 13 and therefore the cross-member 21 from turning about the longitudinal axis of the element 13. The cross-member 21 is resiliently disposed at the entrance end of the opening 26. The element 13 normally is nascent. An annulus or washer 27 is seated in a counterbore 28 in the part 12 surrounding the entrance end of the opening, said washer being pressed tightly in place and serving as a guide for the fastener element 10.

The two parts 11 and 12 may be quickly and easily fastened or secured to each other by bringing the part 11 toward the part 12 so that the shank 14 of the element 10 enters the aperture in the washer 27 which guides the means 16 into engagement with the cross-member 21. By turning the element 10 one-fourth of a revolution with a suitable tool engaged with the head 15, said means 16 cooperating with the cross-member 21 will draw the cross-member 21, subject to the spring tension of the coils 20, in interlocking engagement with the shank 14, thus effecting the fastening of said parts to each other as shown in Figs. 1 and 2. The parts 11 and 12 may be readily unfastened from each other by a reverse turning of the element 10.

It is to be understood that the fastener element 13, together with the plug 24, constitute a fastener unit which may be attached by a single operation in which such unit is driven into functioning position in a suitable opening provided to receive the same wherever wanted. While the end portions 23 are exposed and preferably bear against one flat face of the plug 24, it is to be understood that such portions 23 may be disposed in holes respectively of the body of the plug.

I claim:

1. In a fastening device, a part having an opening therein, a fastener element in said opening, said element being constructed of spring wire stock to provide intermediate spring coils, a cross-member joining said coils on one end of said element at the entrance end of said opening, and anchoring means joining said coils on the other end of said element, said part having a notched piece fixed in said opening at the other end thereof in engagement with said anchoring means to secure said element in place and also serving as an abutment therefor, whereby said coils may function in conjunction with said cross-member so that the latter may be cooperatively engaged by a suitable companion fastener element.

2. In a fastening device, a fastener element consisting of a single piece of material having spring coils, a cooperative cross-member joining the coils and resiliently sustained by the coils, and anchoring portions in continuation of said coils; and a notched plug engaged with said anchoring portions to retain said element in functioning position.

3. A resilient co-engageable fastener element consisting of a single piece of material providing spring coils, a cooperative cross-member joined to the coils to resiliently sustain the cross-member, and anchoring portions in continuation of said coils, the convolutions of one coil intercoiled with convolutions of the other coil; and a plug having means engaged with said anchoring portions to retain the fastener element in functioning position.

4. In a fastening device, a part having an opening therein, a fixed abutment at the inner end of said opening, and a spirally coiled resilient element within said opening having means engaged with said abutment to prevent turning movement of said element, said element also having a portion extending transversely of said opening at the outer entrance end thereof constituting means to be detachably engaged by a suitable cooperative fastener element.

5. A fastener element consisting of a resilient piece of material providing a portion resiliently disposed for cooperative fastening action, said element also having anchoring means, and a plug engaged with said anchoring means adapted to secure said element in place within an opening in a part to be fastened to a second part, by virtue of said anchoring means.

6. A resilient co-engageable fastener element adapted to be arranged within an opening in the part to be fastened, a plug, and coacting means on the element and the plug to retain said element in functioning position within said opening, when the plug is driven into said opening in contact with the wall thereof.

7. In a fastening device, a part having an opening therein, an abutment consisting of a notched plug having a driving fit in said opening, a spring fastener member in said opening, and having a cross member resiliently disposed at the entrance end of said opening, said element having means engaged in the notches in said plug to retain the element in place against turning movement and to maintain the cross member properly disposed.

8. In a fastening device, a part having an opening therein, an abutment fixed to said part in said opening, a fastening element consisting of a single piece of material providing two legs in the form of coil springs arranged so that the coils of one leg are intercoiled with those of the other, a cross member joining said springs between the same and anchoring terminals on said legs, said element being arranged within said opening and the terminals engaging said abutment with the lowermost coils of said springs bearing on said abutment to retain said element in position against turning movement to maintain the cross member properly disposed at the entrance end of said opening.

9. A resilient co-engaging fastening member comprising a unitary piece of spring wire arranged in a pair of similar helical coils having their convolutions intercoiled with each other, said coils being integrally connected by a cross bar at one end, and each coil having an anchoring portion at the opposite end, each of said anchoring portions consisting of a longitudinally extending, relatively elongated wire member having a terminal portion disposed substantially at right angles thereto and the anchoring portions of the respective coils being located at opposite sides of the fastening member.

WILLIAM DZUS.

REFERENCES CITED

The following references are of record in the file of this patent:

UNITED STATES PATENTS

| Number | Name | Date |
|---|---|---|
| 2,148,160 | Hollerith | Feb. 21, 1939 |
| 2,293,581 | Whitesell | Aug. 18, 1942 |
| 2,295,488 | Mack | Sept. 8, 1942 |
| 2,301,477 | Taylor | Nov. 10, 1942 |
| 2,314,746 | White et al. | Mar. 23, 1943 |